(12) United States Patent
Berg

(10) Patent No.: US 9,774,530 B2
(45) Date of Patent: Sep. 26, 2017

(54) MAPPING OF ADDRESS AND PORT (MAP) PROVISIONING

(71) Applicant: Cable Television Laboratories, Inc., Louisville, CO (US)

(72) Inventor: John Berg, Arvada, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 108 days.

(21) Appl. No.: 14/788,610

(22) Filed: Jun. 30, 2015

(65) Prior Publication Data

US 2017/0012873 A1 Jan. 12, 2017

(51) Int. Cl.
*H04L 12/749* (2013.01)
*H04L 12/741* (2013.01)
*H04L 12/46* (2006.01)
*H04L 12/24* (2006.01)
*H04L 12/715* (2013.01)
*H04L 29/12* (2006.01)

(52) U.S. Cl.
CPC ........ *H04L 45/741* (2013.01); *H04L 12/4633* (2013.01); *H04L 41/08* (2013.01); *H04L 45/04* (2013.01); *H04L 45/745* (2013.01); *H04L 61/251* (2013.01); *H04L 61/2517* (2013.01); *H04L 61/2557* (2013.01)

(58) Field of Classification Search
CPC . H04L 45/741; H04L 61/251; H04L 61/2007; H04L 61/2503; H04L 61/6059; H04L 12/2801
See application file for complete search history.

(56) References Cited

U.S. PATENT DOCUMENTS 9,479,440 B1 * 10/2016 Crisp ..................... H04L 47/20
2013/0279518 A1 * 10/2013 Sarikaya ........... H04L 29/06068
370/467

OTHER PUBLICATIONS

Troan et al; "Mapping of Address and Port (MAP) draft-ietf-softwire-map-01;" Jun. 27, 2012.*

* cited by examiner

*Primary Examiner* — Marsha D. Banks Harold
*Assistant Examiner* — Elton Williams
(74) *Attorney, Agent, or Firm* — Great Lakes Intellectual Property, PLLC.

(57) ABSTRACT

Mapping of Address and Port (MAP) provisioning of a device to enable exchange of Internet Protocol version 4 (IPv4) packets with an IP version 6 (IPv6) domain is contemplated. The MAP provisioning may be sufficient to facilitate provisioning of a router to process IPv4 packets for exchange with the IPv6 domain of an associated modem.

20 Claims, 2 Drawing Sheets

MAPPING OF ADDRESS AND PORT (MAP) PROVISIONING

TECHNICAL FIELD

The present invention relates to facilitating Mapping of Address and Port (MAP) provisioning of a device to enable exchange of Internet Protocol version 4 (IPv4) packets with an IP version 6 (IPv6) domain, such as but not necessary limited to facilitating provisioning of a router to process IPv4 packets for exchange with the IPv6 domain of an associated modem.

BACKGROUND

Mapping of Address and Port (MAP) is a new technology in Internet Engineering Task Force (IETF) draft status that may be beneficial to a number of Multiple System Operators (MSOs) or other service providers deploying networks operating according to IPv6. MAP enables the ability to connect IPv4 only client devices in a home network to an IPv6 only MSO network and have the packets routed out to the public IPv4 internet via a Border Relay (BR) device. MAP comes in two flavors: MAP-T and MAP-E. MAP-T is described in IETF draft Mapping of Address and Port using Translation (MAP-T) draft-ietf-softwire-map-t-08 (Dec. 2, 2014), the disclosure of which is hereby incorporated by reference in its entirety herein. MAP-E is described in Mapping of Address and Port with Encapsulation (MAP) draft-ietf-softwire-map-13 (Mar. 9, 2015), the disclosure of which is hereby incorporated by reference in its entirety herein. When supported by a customer edge device, such as an eRouter, the customer edge device itself is capable of translating the IPv4 packet into IPv6 (MAP-T), or encapsulating the IPv4 packet into IPv6 (MAP-E). Effectively, the packet looks like an IPv6 packet when it traverses the eRouter WAN and gets routed on the IPv6 network. The BR device then decapsulates or translates the packet back to IPv4 and routes it to the public IPv4 internet or elsewhere. These two technologies allow MSOs to leverage their IPv6 only networks to allow IPv4 only clients to communicate on their networks.

MAP currently defines Dynamic Host Configuration Protocol version 6 (DHCPv6) as a mechanism for the provisioning of client devices. DHCPv6, as described in described in DHCPv6 Options for configuration of Softwire Address and Port Mapped Clients draft-ietf-softwire-map-dhcp-12 (Mar. 9, 2015), the disclosure of which is hereby incorporated by reference in its entirety herein, requires the client device or other device performing the MAP functions, which may be referred to as a MAP node, to exchange multiple messages with a suitable DHCP server. One non-limiting aspect of the present invention contemplates an alternative mechanism for provisioning MAP to client devices independently of such a DHCP server, such as to enabling provisioning in the absence of DHCP server availability.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
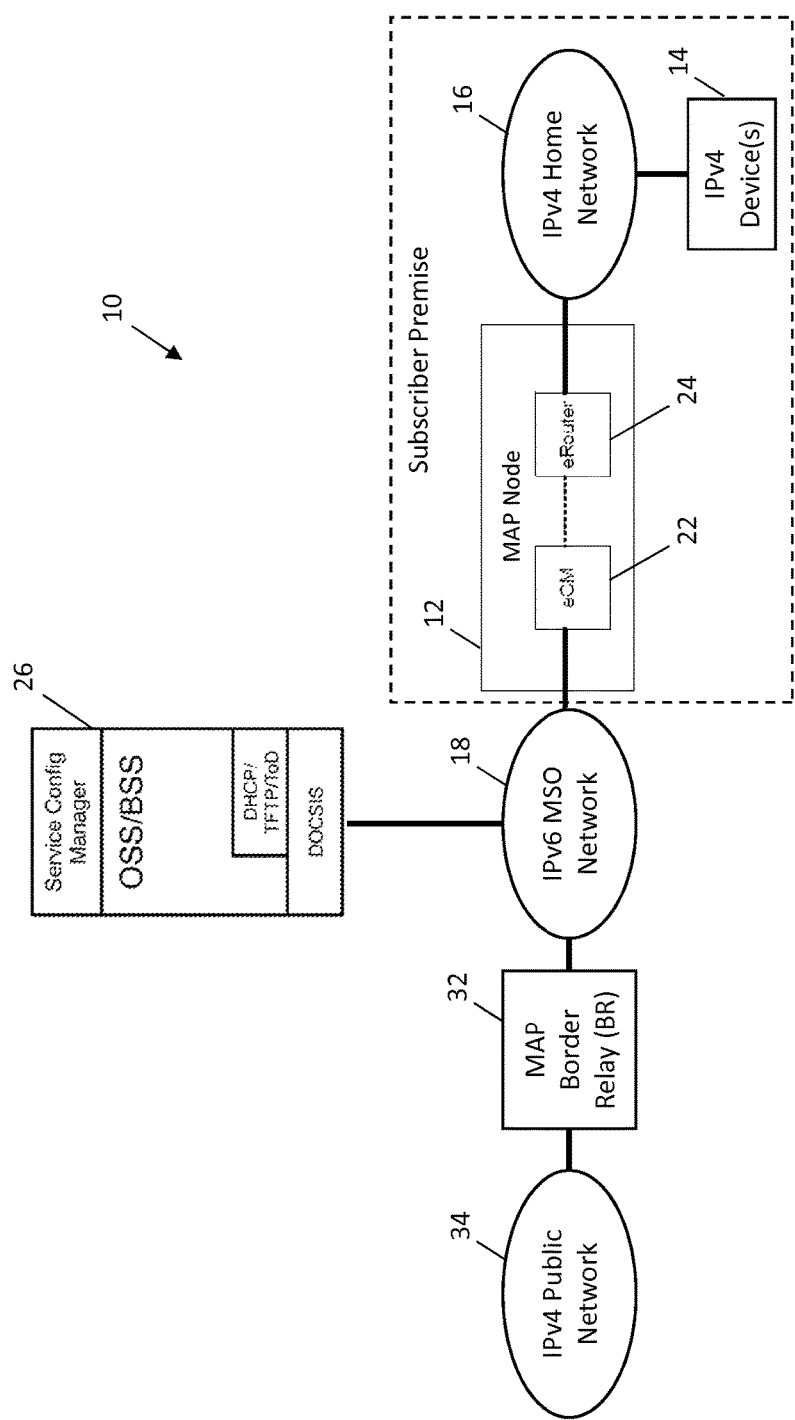
FIG. 1 illustrates a system for facilitating Mapping of Address and Port (MAP) provisioning in accordance with one non-limiting aspect of the present invention.

FIG. 1 illustrates a system 10 for facilitating Mapping of Address and Port (MAP) provisioning in accordance with one non-limiting aspect of the present invention. Internet Protocol (IP) is a computer network protocol (analogous to written and verbal languages) that all machines on the Internet must know in order to communicate with one another, i.e., IP is a layer 3 (network layer) protocol in the Open Systems Interconnection (OSI) model. The vast majority of IP devices support IP version 4 (IPv4) defined in Internet Engineering Task Force (IETF) request for comment (RFC) 791, the disclosure of which is hereby incorporated by reference in its entirety herein, and/or IP version 6 (IPv6) defined in RFC 2460, the disclosure of which is hereby incorporated by reference in its entirety herein. Devices relying on IP may be assigned an IP address (e.g., an IPv4 and/or an IPv6 address) through Dynamic Host Configuration Protocol for IPv4 (DHCPv4) and/or through Dynamic Host Configuration Protocol for IPv6 (DHCPv6), as described in RFCs 2131 and 3315, the disclosures of which are hereby incorporated by reference in their entireties herein. The present invention contemplates facilitating provisioning necessary to enable a MAP node 12 to translate IPv4 packets into IPv6 packets (MAP-T) and/or to encapsulate the IPv4 packet into IPv6 packets (MAP-E).

The MAP node 12 is shown for exemplary non-limiting purposes with respect to being operable on/with a gateway configured to interface one or more IPv4 devices 14 connected to an IPv4 home network 16 with an IPv6 network/domain 18 of an associated multiple service operator (MSO). The illustration is merely exemplary as the present invention fully contemplates its use and application in facilitating MAP provisioning for any device, interface, gateway, etc. tasked with interfacing IPv6 domains with IPv4 networks, IPv4 devices, etc. The exemplary illustration is presented as one of many environments where an MSO or other entity supporting services to any number of subscriber premises may face a problem when desiring to deploy IPv6 domains 18 or other configurations inoperable with the IPv4 devices 14 while also desiring to continue supporting services for the IPv4 devices 14. The gateway 12 is similarly shown for exemplary purposes as an embedded Data-Over-Cable Service Interface Specifications (eDOCSIS) device having an embedded DOCSIS cable modem (eCM) 22 and an embedded router (eRouter) 24, such as that described Data-Over-Cable Service Interface Specifications eDOCSIS™ Specification CM-SP-eDOCSIS-128-150305 (Mar. 5, 2015) and IPv4 and IPv6 eRouter Specification CM-SP-eRouter-115-150528 (May 23, 2015), the disclosures of which are hereby incorporated by reference in their entireties herein.

A service configuration manager 26 having an operating support system (OSS) or business support (BSS) may be configured to facilitate operation of the system. The OSS/BSS may include servers or other capabilities sufficient to facilitate DHCP, Trivial File Transfer Protocol (TFTP), time of day (ToD) and/or DOCSIS. The service configuration manager 26 may include a computer-readable medium having a plurality of non-transitory instructions operable with a process to facilitate issuing messages and undertaking other activities necessary to facilitating the MAP provisioning contemplated herein. A MAP border relay (BR) 30 may be configured in accordance with the MAP-E and MAP-T specifications as a MAP enabled router managed by the MSO or other service provider at the edge of a MAP domain and may include an IPv6-enabled interface connected to the IPv6 network and an IPv4 interface connected to a native or public IPv4 network 34. While the MSO network and home network are labeled respectively as IPv6 and IPv4 networks, the system 10 may optionally include other IPv4 and/or IPv6 networks and/or facilitate other communications between non-IPv4 devices or other devices, servers, phones, etc. associated with the subscribe premise and/or an access point or other construct acting in place of or in additional to the subscriber premise, e.g. the MSO may be an Internet service provider (ISP), cellular phone provider, television service provider, etc. tasked with supporting other services in additional to those associated with enabling the IPv4 devices to communicate over the IPv6 domain.

Figure 2:
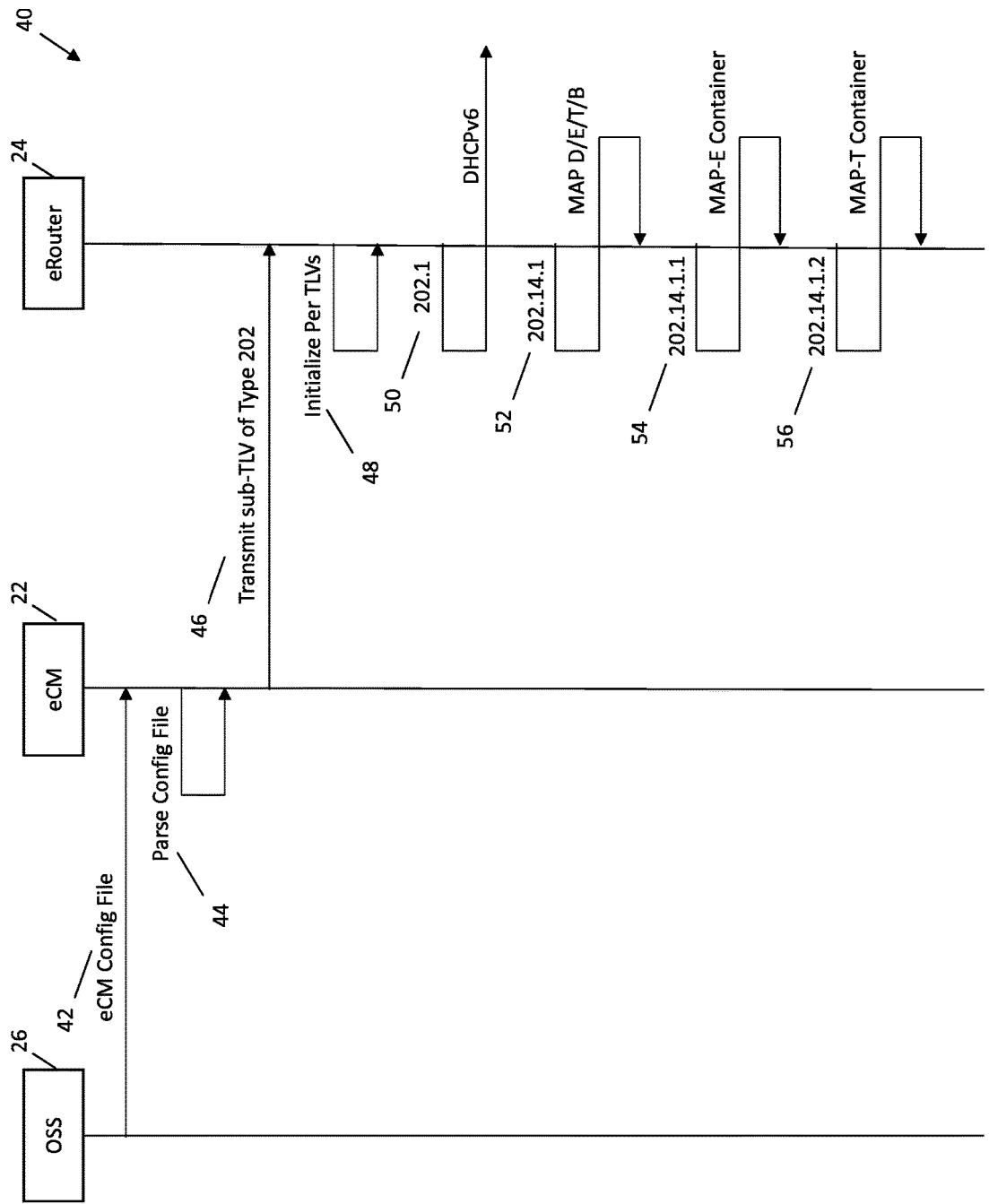
FIG. 2 illustrates a messaging diagram for facilitating MAP provisioning in accordance with one non-limiting aspect of the present invention.

FIG. 2 illustrates a messaging diagram 40 for facilitating MAP provisioning in accordance with one non-limiting aspect of the present invention. The provisioning is described for exemplary purposes with respect to provisioning the router 24 as the MAP node according to informational exchanges between the OSS 12 and the eCM 22 and corresponding informational exchanges between the eCM 22 and eRouter 24 to demonstrate one application of the present invention with respect to the system 10 described above in FIG. 1. The contemplated MAP provisioning may be performed without requiring that the router 24 to obtain MAP configuration parameters, either for MAP-E and/or MAP-T, through interactions with a DHCP server (not shown) or other device, service, etc. other than the eCM 22. The necessary MAP parameters, containers, rules, options, code and other information may be provisioned to the eRouter through mechanisms available within the configuration and initialization processes associated with the eCM 22 and the eRouter 24 and defined within eDOCSIS and IPv4 and IPv6 eRouter specifications noted above. The ability to provision the MAP in this manner may provide the MSO or other entity desired MAP provisioning to provision MAP nodes through means other than the DHCP-based MAP mechanism described above.

An eCM configuration file process 42 relates to the OSS 12 or other management entity providing a configuration file to the eCM 22. The configuration file may be provided to initializing the eCM 22 for use in order to provide configuration parameters and other information necessary for the eCM 22 to boot or to otherwise become operational, and/or at some point after becoming operational, such as to facilitate reconfiguration or otherwise adjusting operation of the eCM 22. The eDOCSIS and IPv4 and IPv6 eRouter specifications noted above provide detail regarding the ability of the eCM 22 to receive and parse the eCM configuration file for purposes of enabling its configuration, initialization, etc. The DOCSIS MAC and Upper Layer Protocols Interface Specification CM-SP-MULPIv3.0-127-150528 (Aug. 3, 2007) and the DOCSIS Operations Support System Interface Specification CM-SP-OSSIv3.0-125-150305 (Mar. 5, 2015), the disclosures of which are hereby incorporated by reference in their entireties herein, provided additional detail regarding the eCM configuration file and the parsing and other operations performed at the eCM 22 as a function thereof.

The eCM configuration file may include a plurality of encodings having the parameters, data and other information necessary to configure its operation included within a plurality of type-length-values (TLVs). The eCM 22 may be configured to parse each of the plurality of TLVs and to configure its operation as a function of the encodings included therein. The noted specifications include various types and subtypes of TLVs for configuring the eCM 22 as wells as additional TLVs to be communicated from the eCM 22 to the eRouter 24 or other embedded devices to configure the operation thereto. The embedded devices may be referred to as eSafes and in additional to the eRouter may include: an embedded CableHome Portal Services Logical Element (ePS), embedded PacketCable 2.0 Digital Voice Adaptor (eDVA); and embedded PacketCable Multimedia Terminal Adapter (eMTA); an embedded PacketCable Security, Monitoring, and Automation Gateway (eSG); an embedded Set-Top Box (eSTB); an embedded T1/E1 TDM Emulation Adapter (eTEA); etc.

The eCM 22 may perform a parsing operation whereby the TLVs relevant to its operation are kept for processing and the TLVs relevant to the other embedded devices are communicated thereto. The parsing operation may include the eCM 22 reviewing a type associated with each of the TLVs and assessing whether the type applies to itself or whether or another one of the embedded devices. The types associated with another one of the embedded devices may be designated as such through the parsing operation. Encodings in the eCM configuration file encapsulated in Type 202 and the sub-types thereof, for example, may be designated for exclusive use with the eRouter 24 and automatically transferred thereto in a transmit operation, optionally in a vendor specific manner. After the eCM 22 successfully completes registration, the eRouter 24 uses the encapsulated TLVs transmitted thereto for an initialization process 48 whereby the eRouter 24 initializes per the 'eRouter Operation Mode' encoding, encapsulated under the TLV 202 in the eCMs configuration file. A plurality of processes 50, 52, 54, 56 may be performed at the eRouter 24 in response to a corresponding one of the Type 202 TLVs are shown and described below in more detail.

An IP related TLV 50 for use in specifying the IP version to be enabled on the eRouter may be represented as:

| Type | Length | Value |
|---|---|---|
| 202.1 | 1 | 0: Disabled<br>1: IPv4 Protocol Enabled<br>2: IPv6 Protocol Enabled<br>3: Dual IP Protocol Enabled<br>4-255: Invalid<br>Default: 3 (Dual IP Protocol Enabled) |

TLV 202.1 may be encoded with the values for enabling IPv6 protocol such that the eRouter automatically performs DHCPv6 for purposes of obtain IPv6 addressing necessary to facilitate interacting with the IPv6 network. An attendant DHCP process may require the eRouter to exchange messages with a corresponding DHCP server, such as in the manner described in RFC 3315.

A sub-TLV 52 for enabling or disabling support for MAP-E and MAP-T may be represented as:

| Type | Length | Value |
|---|---|---|
| 202.14.1 | 1 | 0 - Disabled (default)<br>1 - Enable MAP-E |

| Type | Length | Value |
|------|--------|-------|
|      |        | 2 - Enable MAP-T |
|      |        | 3 - Enable both MAP-E and MAP-T (optional) |

A sub-TLV 54 for containing the list of options used to group all rules and port parameters for a MAP-E node may be represented as:

| Type | Length | Value |
|------|--------|-------|
| 202.14.1.1 | N | List of MAP-E encapsulated options |

For MAP-E configuration, the eRouter 24 may be required to accept the following parameters at a minimum being encoded as the MAP-E encapsulated options necessary to support MAP-E:
S46 Rule Option (IANA DHCPv6 option 89)
S46 BR Option (IANA DHCPv6 option 90)
S46 Port Parameters Option (IANA option 93)

A sub-TLV 56 for containing the list of options used to group all rules and port parameters for a MAP-T node may be represented as:

| Type | Length | Value |
|------|--------|-------|
| 202.14.1.1 | N | List of MAP-T encapsulated options |

For MAP-T configuration, the eRouter may be required to accept the following parameters at a minimum being encoded as the MAP-T encapsulated options necessary to support MAP-T:
S46 Rule Option (IANA DHCPv6 option 89)
S46 DMR Option (IANA DHCPv6 option 91)
S46 Port Parameters Option (IANA option 93)

The above is an example of how the TLVs may be defined in the noted eRouter specification. The container options called out in separate requirements may be those that would be required to be included as a list in the sub-type container options. Additional options may be required, and additional requirements for how to act upon them may also be included. The TLV equivalent encoded lists of encapsulated options may be provided in the TLV container sub-types for either MAP-T or MAP-E as defined above. This capability may make for a more efficient use of TLVs and avoids the need to define additional sub-types, as would be the case if the container option approach were not used.

While the present invention contemplates an alternative to the DHCP MAP provision process noted above, various parameters and information associated with the DHCP mechanism may be included within the TLVs contemplated herein, which may be beneficial in facilitating provisioning according to nomenclature and functions understood by one having ordinary skill in the art. The following description includes text associated with the DHCP MAP mechanism and is reflected herein for exemplary purposes without prejudice. A MAP node may be provisioned with one or more mapping rules. Mapping rules may be used differently depending on their function. Every MAP node must be provisioned with a Basic mapping rule. This is used by the node to configure its IPv4 address, IPv4 prefix or shared IPv4 address. This same basic rule can also be used for forwarding, where an IPv4 destination address and optionally a destination port are mapped into an IPv6 address. Additional mapping rules are specified to allow for multiple different IPv4 sub-nets to exist within the domain and optimize forwarding between them. Traffic outside of the domain (i.e., when the destination IPv4 address does not match (using longest matching prefix) any Rule IPv4 prefix in the Rules database) is forwarded to the BR. There are two types of mapping rules:

1. Basic Mapping Rule (BMR)—mandatory. A MAP nodecan be provisioned with multiple End-user IPv6 prefixes. There can only be one Basic Mapping Rule per End-user IPv6 prefix. However all CE's having End-user IPv6 prefixes within (aggregated by) the same Rule IPv6 prefix may share the same Basic Mapping Rule. In combination with the End-user IPv6 prefix, the Basic Mapping Rule is used to derive the IPv4 prefix, address, or shared address and the PSID assigned to the CE.

2. Forwarding Mapping Rule (FMR)—optional, used for forwarding. The Basic Mapping Rule may also be a Forwarding Mapping Rule. Each Forwarding Mapping Rule will result in an entry in the Rules table for the Rule IPv4 prefix. Given a destination IPv4 address and port within the MAP domain, a MAP node can use the matching The S46 rule option may be used to encode a basic mapping rule (BMR) and/or forward mapping rule (FMR).

The Rule IPv6 prefix (which is part of the End-user IPv6 prefix) that is common among all CEs using the same Basic Mapping Rule within the MAP domain. The EA bits encode the MAP node specific IPv4 address and port information. The EA bits, which are unique for a given Rule IPv6 prefix, can contain a full or part of an IPv4 address and, in the shared IPv4 address case, a Port-Set Identifier (PSID). An EA-bit length of 0 signifies that all relevant MAP IPv4 addressing information is passed directly in the BMR, and not derived from the End-user IPv6 prefix. The MAP IPv6 address is created by concatenating the End-user IPv6 prefix with the MAP subnet identifier (if the End-user IPv6 prefix is shorter than 64 bits) and the interface identifier. The MAP subnet identifier is defined to be the first subnet (s bits set to zero).

Define: r=length of the IPv4 prefix given by the BMR; o=length of the EA bit field as given by the BMR; p=length of the IPv4 suffix contained in the EA bit field. The length r MAY be zero, in which case the complete IPv4 address or prefix is encoded in the EA bits. If only a part of the IPv4 address/prefix is encoded in the EA bits, the Rule IPv4 prefix is provisioned to the MAP node by other means (e.g., a DHCPv6 option). To create a complete IPv4 address (or prefix), the IPv4 address suffix (p) from the EA bits, is concatenated with the Rule IPv4 prefix (r bits).

The offset of the EA bits field in the IPv6 address is equal to the BMR Rule IPv6 prefix length. The length of the EA bits field (o) is given by the BMR Rule EA-bits length, and can be between 0 and 48. A length of 48 means that the complete IPv4 address and port is embedded in the End-user IPv6 prefix (a single port is assigned). A length of 0 means that no part of the IPv4 address or port is embedded in the address. The sum of the Rule IPv6 Prefix length and the Rule EA-bits length MUST be less or equal than the End-user IPv6 prefix length.

If $o+r<32$ (length of the IPv4 address in bits), then an IPv4 prefix is assigned. This case is shown in FIG. 4. If $o+r$ is equal to 32, then a full IPv4 address is to be assigned. The address is created by concatenating the Rule IPv4 prefix and the EA-bits. This case is shown in FIG. 5. If $o+r$ is >32, then a shared IPv4 address is to be assigned. The number of IPv4 address suffix bits (p) in the EA bits is given by 32−r bits. The PSID bits are used to create a port set. The length of the PSID bit field within EA bits is: q=o−p. The length of r MAY be 32, with no part of the IPv4 address embedded in the EA bits. This results in a mapping with no dependence between the IPv4 address and the IPv6 address. In addition the length of o MAY be zero (no EA bits embedded in the End-User IPv6 prefix), meaning that also the PSID is provisioned using e.g., the DHCP option.

The Forwarding Mapping Rule is optional, and used in mesh mode to enable direct MAP node to MAP node connectivity. On adding an FMR rule, an IPv4 route is installed in the Rules table for the Rule IPv4 prefix.

If operating according to MAP-E, IPv4 traffic between MAP nodes that are all within one MAP domain is encapsulated in IPv6, with the sender's MAP IPv6 address as the IPv6 source address and the receiving MAP node's MAP IPv6 address as the IPv6 destination address. To reach IPv4 destinations outside of the MAP domain, traffic is also encapsulated in IPv6, but the destination IPv6 address is set to the configured IPv6 address of the MAP BR. On the MAP node, the path to the BR can be represented as a point to point IPv4 over IPv6 tunnel with the source address of the tunnel being the MAP node's MAP IPv6 address and the BR IPv6 address as the remote tunnel address. When MAP is enabled, a typical MAP node router will install a default IPv4 route to the BR. The BR forwards traffic received from the outside to CE's using the normal MAP forwarding rules.

If operating according to MAP-T, IPv4 traffic sent by MAP nodes that are all within one MAP domain is translated to IPv6, with the sender's MAP IPv6 address, derived via the Basic Mapping Rule (BMR), as the IPv6 source address and the recipient's MAP IPv6 address, derived via the Forward Mapping Rule (FMR), as the IPv6 destination address. IPv4 addressed destinations outside of the MAP domain are represented by means of IPv4-Embedded IPv6 address, using the BR's IPv6 prefix. For a MAP node sending traffic to any such destination, the source address of the IPv6 packet will be that of the CE's MAP IPv6 address, and the destination IPv6 address will be the destination IPv4-embedded-IPv6 address. This address mapping is termed as following the MAP-T Default Mapping Rule (DMR) and is defined in terms of the IPv6 prefix advertised by one or more BRs, which provide external connectivity. A typical MAP-T MAP node will install an IPv4 default route using this rule. A BR will use this rule when translating all outside IPv4 source addresses to the IPv6 MAP domain. The DMR IPv6 prefix-length SHOULD be by default 64 bits long, and in any case MUST NOT exceed 96 bits. The mapping of the IPv4 destination behind the IPv6 prefix will by default follow the /64. Any trailing bits after the IPv4 address are set to 0x0.

The Basic Mapping Rule encoded, noted above as S46 Rule Option (IANA DHCPv6 option 89), may be used by the MAP node to provision itself with an IPv4 prefix, IPv4 address or shared IPv4 address and may include the following parameters: a rule IPv6 prefix, a rule IPv4 prefix and a rule embedded-address (EA)-bits length. The port parameter option encoding, noted above as S46 Port Parameters Option (IANA option 93), may include a Port-set ID (PSID) value whereby the MAP node provisions a set of ports according to the PSID value. The border relay (BR) option encoding, noted above as the S46 BR Option (IANA DHCPv6 option 90), may include a BR-IPv6 address for provisioning the IPv6 address for the border relay. The default mapping route (DMR) option encoding, noted above as the S46 DMR Option (IANA DHCPv6 option 91), may include a DMR-IPv6 prefix for provisioning the IPv6 address for a border relay.

The DHCP MAP mechanism provides additional detail regarding the foregoing encodes as well as other options that may be similarly encapsulated within the TLV encodes or otherwise provided to the eRouter via corresponding TLVs for purposes of similarly provisioning the MAP node capabilities.

With respect to the S46 rule (OPTION_S46_RULE), the corresponding TLV may encode the following values noted in the DHCP MAP mechanism:

ea-len: 8 bits long field that specifies the Embedded-Address (EA) bit length. Allowed values range from 0 to 48.

prefix4-len: 8 bits long field expressing the prefix length of the IPv4 prefix specified in the rule-ipv4-prefix field. Valid values 0 to 32.

ipv4-prefix: a fixed length 32 bit field that specifies the IPv4 prefix for the S46 rule. The bits in the prefix after prefix4-len number of bits are reserved and MUST be initialized to zero by the sender and ignored by the receiver.

prefix6-len: 8 bits long field expressing the length of the IPv6 prefix specified in the rule-ipv6-prefix field.

ipv6-prefix: a variable length field that specifies the IPv6 domain prefix for the S46 rule. The field is padded on the right with zero bits up to the nearest octet boundary when prefix6-len is not evenly divisible by 8.

S46_RULE-options: a variable field that may contain zero or more options that specify additional parameters for this S46 rule. This document specifies one such option, OPTION_S46_PORTPARAMS.

F-Flag: 1 bit field that specifies whether the rule is to be used for forwarding (FMR). If set, this rule is used as a FMR, if not set this rule is a BMR only and MUST NOT be used for forwarding. Note: A BMR can also be used as an FMR for forwarding if the F-flag is set. The BMR rule is determined by a longest-prefix match of the Rule-IPv6-prefix against the End-User IPv6 prefix(es).

With respect to the S46 BR option (OPTION_S46_BR), the corresponding TLV may encode the following values noted in the DHCP MAP:

br-ipv6-address: a fixed length field of 16 octets that specifies the IPv6 address for the S46 BR.

With respect to the S46 DMR option (OPTION_S46_DMR), the corresponding TLV may encode the following values noted in the DHCP MAP:

dmr-prefix6-len: 8 bits long field expressing the bit mask length of the IPv6 prefix specified in the dmr-ipv6-prefix field.

dmr-ipv6-prefix: a variable length field specifying the IPv6 prefix or address for the BR. This field is right padded with zeros to the nearest octet boundary when dmr-prefix6-len is not divisible by 8.

With respect to the S46 port parameters option (OPTION_S46_PORTPARAMS), the corresponding TLV may encode the following values noted in the DHCP MAP:

offset: (PSID offset) 8 bits long field that specifies the numeric value for the S46 algorithm's excluded port range/offset bits (a-bits). Allowed values are between 0 and 15. Default values for this field are specific to the software mechanism being implemented and are defined in the relevant specification document.

PSID-len: Bit length value of the number of significant bits in the PSID field. (also known as 'k'). When set to 0, the PSID field is to be ignored. After the first 'a' bits, there are k bits in the port number representing the value of the Port SetIdentifier (PSID). Consequently, the address sharing ratio would be 2^k.

PSID: Explicit 16-bit (unsigned word) PSID value. The PSID value algorithmically identifies a set of ports assigned to a CE. The first k bits on the left of this field contain the PSID value. The remaining (16-k) bits on the right are padding zeros.

An additional IPv4/IPv6 Address Binding Option (OPTION_S46_V4V6BIND) may be used to specify the full or shared IPv4 address of the CE. The IPv6 prefix field is used by the CE to identify the correct prefix to use for the tunnel source. The corresponding TLV may encode the following values noted in the DHCP MAP:

ipv4-address: A fixed field of 4 octets specifying an IPv4 address.

bindprefix6-len: 8 bits long field expressing the bit mask length of the IPv6 prefix specified in the bind-ipv6-prefix field.

bind-ipv6-prefix: a variable length field specifying the IPv6 prefix or address for the S46 CE. This field is right padded with zeros to the nearest octet boundary when bindprefix6-len is not divisible by 8.

S46_V4V6BIND-options: a variable field that may contain zero or more options that specify additional parameters. This document specifies one such option, OPTION_S46_PORTPARAMS.

An additional Softwire46 MAP-E Container Option (OPTION_S46_CONT_MAPE) may be used to specify the container used to group all rules and optional port parameters for a specified domain. The corresponding TLV may encode the following values noted in the DHCP MAP:

encapsulated-options: options associated with this Softwire46 MAP-E domain.

An additional option Softwire46 MAP-T Container Option (OPTION_S46_CONT_MAPT) may be used to specify the container used to group all rules and optional port parameters for a specified domain. The corresponding TLV may encode the following values noted in the DHCP MAP:

encapsulated-options: options associated with this Softwire46 MAP-T domain.

An additional Softwire46 LightWeight 46 Container Option (OPTION_S46_CONT_LW) may be used to specify the container used to group all rules and optional port parameters for a specified domain. The corresponding TLV may encode the following values noted in the DHCP MAP:

encapsulated-options: options associated with this Softwire46 domain.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for provisioning a router embedded with a modem as a Mapping of Address and Port (MAP) node operable to facilitate transport Internet Protocol version 4 (IPv4) packets over an IP version 6 (IPv6) domain, the method comprising:

parsing a configuration file received at the modem having a plurality of type-length-values (TLVs), including determining a first plurality of the plurality of TLVs within the configuration file to be for provisioning the modem to communicate over the IPv6 domain and a second plurality of the plurality of TLVs within the configuration file to be for provisioning the router as the MAP node, including determining the second plurality of TLVs to include at least a first TLV having a first value set to one of a disable value and enable value;

configuring the modem to operate according to the first plurality of TLVs; and communicating the second plurality of TLVs and not the first plurality of TLVs from the modem to the router to configure the MAP node operation of the router, including disabling the MAP node if the first value is set to the disable value and enabling the MAP node if the first value is set to the enable value.

2. The method of claim 1 further comprising:

setting the enable value to at least one of an encapsulation value and a translation value; and the router provisioning the MAP node to encapsulate the IPv4 packets for transport over the IPv6 domain when the enable value is set to the encapsulation value and to translate the IPv4 packets for transport over the IPv6 domain when the enable value is set to the translation value.

3. The method of claim 1 further comprising:

determining the second plurality of TLVs to include a second TLV, the second TLV having a second value encoding a Basic Mapping Rule (BMR), the BMR including an IPv6 prefix, a IPv4 prefix and an embedded-address (EA)-bits length; and communicating the second TLV from the modem to the router whereafter the router provisions addressing for the MAP node based on the IPv6 prefix, the IPv4 prefix and the EA-bits length within the second TLV such that the router is provisioned with the IPv6 and IPv4 prefixes without having to communicate with a Dynamic Host Configuration Protocol (DHCP) server generating the IPv6 and IPv4 prefixes.

4. The method of claim 3 further comprising:

the second TLV including encoding of a port parameter option having a Port-set ID (PSID) value; and the router provisioning a set of ports assigned to MAP node according to the PSID value.

5. The method of claim 4 further comprising:

the second TLV including encoding of a border relay (BR) option having a BR-IPv6 address; and the router provisioning an IPv6 address for a border relay according to the BR option within the second TLV such that the router is provisioned with the BR-IPv6 address without having to communicate with the DHCP server generating the BR-IPv6 address.

6. The method of claim 4 further comprising:

the second TLV including encoding a default mapping route (DMR) option having a DMR-IPv6 prefix; and the router provisioning an IPv6 address for a border relay according to the BR option within the second TLV such that the router is provisioned with the DMR-IPv6 prefix without having to communicate with the DHCP server generating the DMR-IPv6 prefix.

7. A system for enabling an Internet Protocol version 4 (IPv4) device to transport IPv4 packets over an IP version 6 (IPv6) domain comprising:

a modem configured to transport IPv6 packets over the IPv6 domain according to parameters represented with a first plurality of type-length-values (TLVs) specified in a configuration file, the modem being configured to execute a parsing operation sufficient for:
i) recovering the first plurality of TLVs from the configuration file during an initialization process;
ii) differentiating the first plurality of TLVs included in the configuration file from one or more Mapping of Address and Port (MAP) TLVs included in the configuration file;
iii) communicating the one or more MAP TLVs; and
a router configured to operate as a MAP node in response to receipt of the one or more MAP TLVs from the modem, the MAP TLVs being sufficient to configure the router during a boot process to facilitate transport of IPv4 packets from the IPv4 device over the IPv6 domain via the modem.

8. The system of claim 7 wherein one or more of the MAP TLVs is sufficient to enable to MAP node to encapsulate the IPv4 packets for transport over the IPv6 domain.

9. The system of claim 7 wherein one or more of the MAP TLVs is sufficient to enable to MAP node to translate the IPv4 packets for transport over the IPv6 domain.

10. The system of claim 7 wherein a first TLV of the MAP TLVs encodes a basic mapping rule (BMR) such that the router obtains the BMR from the first TLV without having to communicate with a Dynamic Host Configuration Protocol (DHCP) generating the BMR.

11. The system of claim 7 further comprising an operating support system (OSS) generating the configuration file and subsequently transporting the configuration file to the modem, wherein the OSS generates a first TLV of the MAP TLVs with an enable value set to at least one of an encapsulation value and a translation value.

12. The system of claim 11 wherein the MAP node encapsulates the IPv4 packets for transport over the IPv6 domain when the enable value is set to an encapsulation value and translates the IPv4 packets for transport over the IPv6 domain when the enable value is set to the translation value.

13. The system of claim 11 wherein:
the OSS generates a second TLV of the MAP TLVs with a Basic Mapping Rule (BMR) according to information received from a Dynamic Host Configuration Protocol (DHCP) server, the BMR including an IPv6 prefix, a IPv4 prefix and an embedded-address (EA)-bits length; and
the router receives the second TLV from the modem and subsequently provisions addressing for the MAP node based on the ipv6 prefix, the ipv4 prefix and the EA-bits length within the second TLV, thereby correspondingly provisioning the router without requiring the router to communicate with the DHCP server.

14. The system of claim 13 wherein:
the second TLV includes encoding of a port parameter option having a Port-set ID (PSID) value; and
the router provisioning a set of ports assigned to MAP node according to the PSID value.

15. The system of claim 14 wherein:
the second TLV includes encoding of a border relay (BR) option having a BR-IPv6 address specified by the DHCP server; and
the router provisioning an IPv6 address for a border relay according to the BR option, thereby correspondingly provisioning the router without requiring the router to communicate with the DHCP server.

16. The system of claim 14 wherein:
the second TLV includes encoding of a default mapping route (DMR) option having a DMR-IPv6 prefix specified by the DHCP server; and
the router provisioning an IPv6 address for a border relay according to the BR option, thereby correspondingly provisioning the router without requiring the router to communicate with the DHCP server.

17. The system of claim 7 wherein the modem is configured to differentiate the MAP TLVs from the plurality of TLVs as a function of a type associated therewith.

18. The system of claim 7 wherein the router is configured to operate as the MAP node without determining a Basic Mapping Rule (BMR) using Dynamic Host Configuration Protocol (DHCP).

19. A system for enabling an Internet Protocol version 4 (IPv4) device to transport IPv4 packets over an IP version 6 (IPv6) domain comprising:
an operating support system (OSS) having a non-transitory computer-readable medium with a plurality of instructions executable with an associated processor to facilitate:
i) communicating with a Dynamic Host Configuration Protocol (DHCP) server to generate a Basic Mapping Rule (BMR) sufficient for specifying an IPv6 prefix, a IPv4 prefix and an embedded-address (EA)-bits length according to corresponding information received from the DHCP server;
ii) generating a first plurality of type-length-values (TLVs) sufficient to facilitate instructing transport of IPv6 packets over the IPv6 domain;
iii) generating a second plurality of TLVs having parameters sufficient to facilitate instructing implementation of a Mapping of Address and Port (MAP) node, the second plurality of TLVs including parameters sufficient for specifying the BMR;
iv) generating a configuration file having both of the first and second plurality of TLVs; and
v) communicating the configuration file;
a modem having a non-transitory computer-readable medium with a plurality of instructions executable with an associated processor to facilitate:
i) processing the configuration file communicated from the OSS;
ii) differentiating the first plurality of TLVs from the second plurality of TLVs included in the configuration file;
iii) without correspondingly configuring operation of the modem according to the second plurality of TLVs, configuring operation of the modem according to the first plurality of TLVs during an initialization process; and
iv) without correspondingly communicating the first plurality of TLVs, communicating the second plurality of TLVs during a parsing operation; and
a router having a non-transitory computer-readable medium with a plurality of instructions executable with an associated processor to facilitate:
i) processing the second plurality of TLVs communicated from the modem; and
ii) without corresponding communicating with either of the OSS and the DHCP sever, configuring the router during a boot process to operate as the MAP node according to the parameters specified in the second plurality of TLVs, thereby facilitating transport of IPv4 packets from the IPv4 device over the IPv6 domain via the modem.

20. The system of claim 19 wherein:

the second plurality of TLVs includes encoding of a border relay (BR) option having a BR-IPv6 address specified by the DHCP server; and the router provisioning an IPv6 address for a border relay according to the BR option, thereby correspondingly provisioning the router without requiring the router to communicate with the DHCP server.

\* \* \* \* \*